United States Patent [19]

Kito

[11] Patent Number: 4,937,617
[45] Date of Patent: Jun. 26, 1990

[54] PHOTOGRAPHIC PRINTING METHOD
[75] Inventor: Eiichi Kito, Kanagawa, Japan
[73] Assignee: Fuji Photo Film Co., Ltd., Kanagawa, Japan
[21] Appl. No.: 322,027
[22] Filed: Mar. 13, 1989
[30] Foreign Application Priority Data Mar. 14, 1988 [JP] Japan .................................. 63-59738

[51] Int. Cl.⁵ ............................................. G03B 27/52
[52] U.S. Cl. ......................................... 355/41; 355/77
[58] Field of Search ....................... 355/38, 40, 41, 68, 355/77, 97; 250/559, 561, 571

[56] References Cited

U.S. PATENT DOCUMENTS

| | | | |
|---|---|---|---|
| 4,043,667 | 8/1977 | Machida | 355/97 |
| 4,291,972 | 9/1981 | Laska et al. | 355/40 |
| 4,294,537 | 10/1981 | Laska et al. | 355/40 X |
| 4,728,996 | 3/1988 | Matsumoto | 355/68 X |

FOREIGN PATENT DOCUMENTS 56-128932 10/1981 Japan .
56-128933 10/1981 Japan .

Primary Examiner—L. T. Hix
Assistant Examiner—D. Rutledge
Attorney, Agent, or Firm—Sughrue, Mion, Zinn, Macpeak & Seas

[57] ABSTRACT

A photographic printing method in which images on frames of an original film are printed onto printing paper. Before printing is effected, data which is necessary for printing is stored onto a storage medium. Before any printing is effected in the printing step, the data is read and checked. Because data which is necessary to the printing step is checked prior to the start of printing, it is possible to prevent errors from occurring in the printing step.

16 Claims, 12 Drawing Sheets

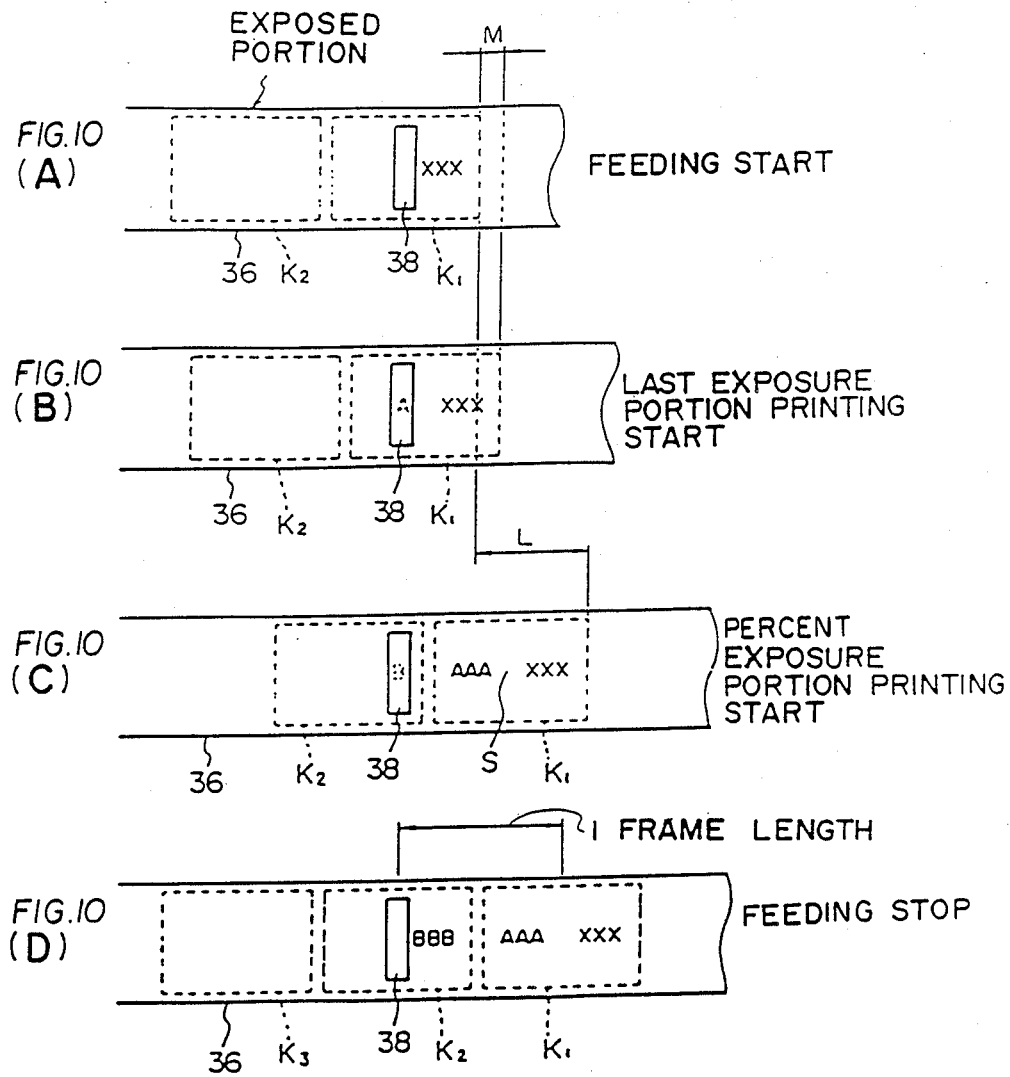

PHOTOGRAPHIC PRINTING METHOD

BACKGROUND OF THE INVENTION

1. Field of the Invention

The present invention relates to a photographic printing method and, more particularly, to a method of the type, in which data such as exposure amount correction data stored on perforated tape is read therefrom, and images of an original film such as a negative that have been developed are printed on printing paper.

2. Related Art

Hitherto, one type of automatic photograph printer is known in which images recorded on frames of a negative film that has been subjected to development are printed on printing paper. When printing is to be performed using such an automatic photograph printer, an inspection process is effected using an inspection apparatus prior to printing so that printing will be performed by the automatic photograph printer on the basis of the results of the inspection. Such an inspection apparatus includes a notch puncher which forms semi-circular notches on one longitudinal edge of the negative film at positions corresponding to the frames that have images to be printed. Also, perforations are formed on a piece of tape-shaped paper, serving as a data storage medium, in accordance with data concerning the correction of exposure amounts calculated by the automatic photograph printer on the basis of, e.g., the detected average transmission density. The notches are used in the automatic photograph printer to set the printing position, a particular frame having an image to be printed by the printer. During such a position determining operation, while the negative film is fed by a film feeder of the automatic photograph printer, the notches are detected by, for instance, a photoelectric switch. When one of the notches is detected, the feeding of the negative film is stopped so that the image frame corresponding to the detected notch is positioned in the printing position. At this time, the perforated tape is fed in synchronization with the negative film, and the particular exposure amount correction data corresponding to the image frame stopped at the printing position is read. The automatic photograph printer then operates to correct the calculated exposure amount on the basis of the thus read correction data so as to obtain an optimal exposure amount. Thereafter, the printer performs printing using the thus obtained optimal exposure amount. Further, the printer performs a data printing operation in which a frame number is printed on the reverse surface of the printing paper which has been subjected to printing, so that it will be easy to designate particular frames at the time of reprinting (Japanese Patent Laid-Open Nos. 128932/1981 and 128933/1981).

However, if the exposure amount correction data is input or read erroneously, there is a risk that the printing of the image on the frame stopped at the printing position cannot be performed properly using the optimal exposure amount. A similar problem is encountered in the case where the perforated tape stores thereon numbers corresponding to the frames so as to allow the printing of numbers on printing paper which has been subjected to printing. This problem is that, if the numbers are input or read erroneously, there is a risk that the numbers cannot be printed on the printing paper in correspondence with the image frames of the film, in which case it is difficult to ensure correct designation of the frames.

SUMMARY OF THE INVENTION

The present invention has been accomplished to overcome the above-stated problems. It is an object of the present invention to provide a photographic printing method in which data to be used during printing is checked beforehand to see if there have been any errors in the inputting or reading of the data, and which is thus capable of effecting optimal printing and data printing processes.

In order to achieve the above-stated object, the present invention provides a photographic printing method in which data that is necessary at a certain printing step is stored onto a storage medium before the printing step. During the printing step, the data is read and the printing is effected. According to the present invention, the data of the first frame in a series of frames of the image is read and checked before printing is performed.

When the printing step requires frame numbers to be assigned to the frames with images to be printed, the stored data may be checked by determining whether a series of read frame numbers changes in an increasing direction or a decreasing direction.

When the printing step requires frame numbers to be assigned to the frames with images to be printed, the stored data may be further checked by estimating the frame number of a particular frame on the basis of the amount by which the original film has been fed and the size of the frames with the images, and comparing the thus estimated frame number with the read frame number.

Further, frame number data which indicates the total number of frames with images to be printed may be stored on the storage medium, so that the stored data can be checked by comparing the read number of items of data necessary for the printing step with the frame number data.

There are two cases with respect to the printing step in the method of the present invention. One is the case where a printing process alone, in which images on frames are printed on printing paper, is effected. The other is the case where both a printing process and a data printing process, in which necessary data are printed on printing paper resulting from the printing process, are effected. In the case where the printing process alone is effected, the printing step requires data necessary for the exposure, such as exposure amount correction data. In the case where both the printing process and the data printing process are effected, the printing step requires data necessary for data printing, in addition to data necessary for exposure. Data, which is necessary for the printing step, is stored on a storage medium before the printing step. During the printing step, before the frame leading a series of frames with images is subjected to printing, the stored data is read and a check is made as to whether any input or reading errors have occurred. A conventional method such as a parity check may be used as the checking method. Since such stored data forms a set in correspondence with one series of frames (i.e., with one order, or one film), the checking may preferably be performed by reading all the data corresponding to one series of frames. However, data corresponding to a plurality of series of frames may be read and checked when necessary.

Since the frame numbers within one series of frames change in such a manner as to increase or decrease in the order (i.e., the input or reading order) in which the data is arranged, error checking can be performed by determining if the read frame numbers increase or decrease.

After the position of the frame leading an original film has been determined, the original film is fed by a length corresponding to the product of the length of each frame and any integer. (The original is usually fed by a length corresponding to the length of a single frame. However, when there is any frame whose image need not be printed, the original film is fed by a length including the length of this frame). Because of this fact, the frame number of a particular frame can be estimated from the amount by which the original film has been fed and the size of the frames. Error checking can be performed by comparing the thus estimated frame number and the read frame number. At this time, data on the position of the image frames may further be used.

The number of items of data necessary for the printing step normally corresponds to the total number of frames with images which are to be printed. Therefore, when frame number data which indicates the total number of each series of frames with images to be printed is stored on a storage medium, and when the read number of items of data necessary for printing with respect to a particular series of frames is compared with the relevant frame number data, it is possible to find out errors in input or reading data on the basis of difference between both the data of the frame numbers and the number of items required for the printing step.

As described above, according to the present invention, by virtue of the arrangement in which the data stored in the storage medium is checked prior to printing to see if there have been any errors in the input or reading of the data, it is possible to prevent bad or poor printing from occurring.

BRIEF DESCRIPTION OF THE DRAWINGS

FIGS. 10 (A) to (D) are views schematically showing the relation between the feeding of printing paper and data printing.

DESCRIPTION OF PREFERRED EMBODIMENT

One embodiment of the present invention will be described in detail with reference to the drawings. In this embodiment, the present invention is applied to the following case: a plurality of negative films are linked together by a plurality of pieces of splicing tape; notches are formed by an inspection apparatus in correspondence with certain frames of the negative films which have images to be printed; data including exposure amount correction data, position data and data indicating frame numbers, and corresponding to the frames with the images to be printed are stored on perforated tape comprising a tape-shaped member; and a printing process and a data printing process are performed during the printing step.

Figure 1:
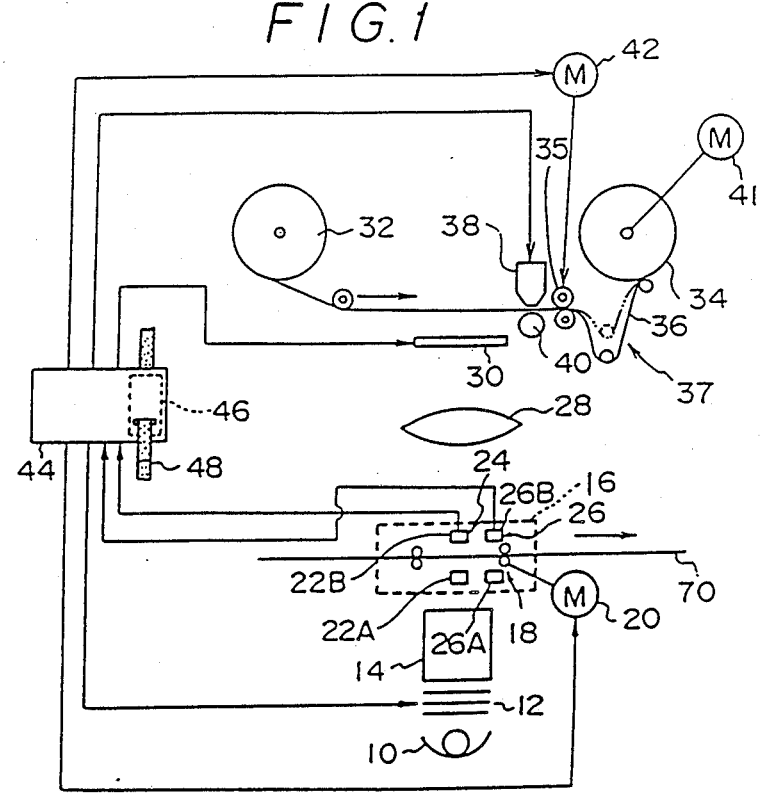
FIG. 1 is a view showing the overall structure of a printing optical system of an automatic photograph printer to which the present invention is applicable.

FIG. 1 is a view showing the overall structure of a printing optical system of an automatic photograph printer to which the present invention is applicable. The system includes a light source 10 comprising a halogen lamp having on the reverse side thereof a reflecting mirror consisting of a cold mirror. In order to lengthen the life of the light source 10 and also to obtain a predetermined color temperature, a voltage of about 90% of the rated voltage is supplied to the light source 10 from a power source, not shown. On the light-radiation side of the light source 10, a light adjusting filter 12, a light diffusing cylinder 14 having a diffusing plate, and a film feeder 16 for feeding a negative film 70 are disposed in this order. The light adjusting filter 12 comprises filter members of three complementary colors, i.e., Y (yellow), M (magenta), and C (cyan). Each filter member has two substantially quarter-circular or fan-shaped filter plates formed on the logarithmic curve, which are combined and laterally disposed as a pair. The system has the following arrangement. When light is radiated from the light source 10, the color balance and the quantity of light are adjusted by the adjusting filter 12. Thereafter, the light is transformed by the light diffusing cylinder 14 into evenly diffused light. The diffused light is radiated onto a negative film 70 which is fed by the film feeder 16. The film feeder 16 is provided with drive rollers 18 allowing the feeding of the negative film 70 by holding the film 70 therebetween; a notch detector 24 comprising a light emitting element 22A and a light receiving element 22B which are disposed in opposition to each other, with the longitudinal edges of the negative film 70 disposed therebetween; and a splice detector 26 which comprises, similar to the notch detector 24, a light emitting element 26A and a light receiving element 26B that are disposed in opposition to each other, and which are provided to detect splicing tape. The drive rollers 18 are rotated by the operation of a pulse motor 20.

Figure 3:
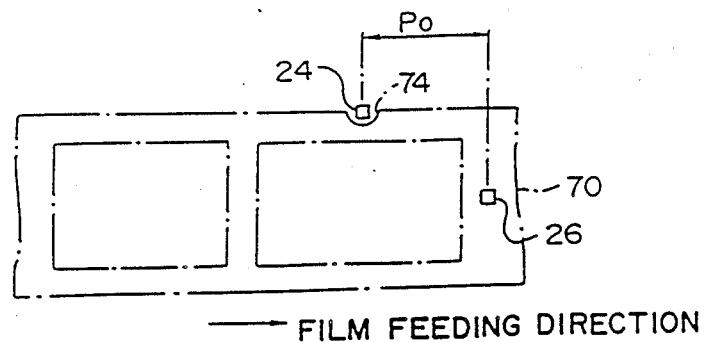
FIG. 3 is a view schematically showing the positional relationship between a notch detector and a splice detector.
Figure 5:
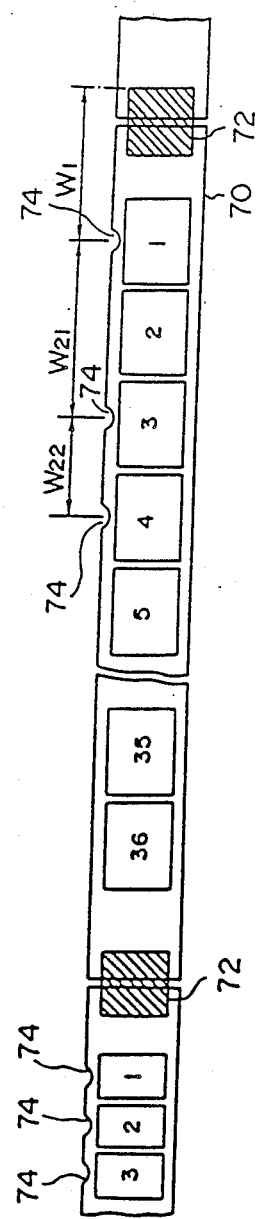
FIG. 5 is a view schematically showing a negative film and position data.

As shown in FIGS. 3 and 5, the negative film 70 has notches 74 already formed by a notch puncher on one longitudinal edge at positions corresponding to the frames thereof that have images to be printed. The negative film 70 comprises a plurality of negative films linked together by pieces 72 of splicing tape and rolled up. A leader portion, not shown, is formed by another piece of splicing tape and is provided at the front end of the negative film leading the plurality of films. As shown in FIG. 3, the notch detector 24 is provided at a position opposing the side edge of the negative film 70 and enabling the detection of the notches 74. The splice detector 26 is provided at a position enabling the detection of splicing tape pieces 72 and ensuring that the printing light is not blocked during printing.

On the side of the negative film 70 where light transmitted therethrough propagates, a lens 28 and a black shutter 30 are disposed in this order. Their arrangement is such that, when the shutter 30 is opened, the light transmitted through the negative film 70 forms on printing paper 36 an image corresponding to a frame image. The printing paper 36 forms a supply roll 32 and a winding roll 34 thereof, with a part of the paper 36 extending therebetween. The printing paper 36 is fed by an amount corresponding to the length of a single frame when drive rollers 35 are rotated by a pulse motor 42. The winding roll 34 is rotated by another pulse motor 41. In order to keep the tension of the printing paper 36 constant, a dancer mechanism 37 is provided between the drive rollers 35 and the winding roll 34. Printing paper which has been exposed passes through a developing process section, not shown, where it is subsequently subjected to developing, fixing, washing, and drying, and, thereafter, it is prepared as prints. On the downstream side of the exposed portion of the printing paper 36, a printer 38 for printing data, such as a dot printer, is provided. Also, a platen 40 is provided so that printing of data can be effected while the printing paper 36 is held between these members 38 and 40. The data printer 38 is connected to a control circuit 44 comprising a microcomputer, etc. Also connected to the control circuit 44 is a reader 46 for reading data stored on perforated tape 48.

Figure 4:
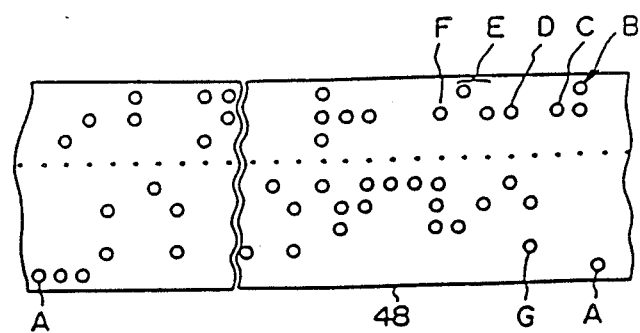
FIG. 4 is a plan view of perforated tape.

As shown in FIG. 4, various data is sequentially stored on the perforated tape 48 in the form of holes. The stored data includes splice data A for discriminating one film (i.e., discriminating one order), data B on the kind of the negative, data C indicating the size (e.g., full size or half size) of the image frames, data G indicating the total number of the frames within one film that have images to be printed, and frame data concerned with each of the frames with images and stored in correspondence therewith, such as data D indicating frame numbers, exposure amount correction data E, and data F on the position of the frames with the images to be printed. The exposure amount correction data E is determined in a stepped manner, for instance, from D (−4) through N to D (−9). There are the same number of items of data E as the total number of the frames with the images to be printed. Data F indicates the position of the frames with the images to be printed in the manner shown in FIG. 5. Data F indicates the distance W1 from the splicing tape piece 72 to the notch corresponding to this leading frame with respect to a leading frame having an image to be printed, and indicates the distance W21 from the notch corresponding to the leading frame to the notch corresponding to this subsequent frame with respect to a subsequent frame having an image to be printed, and also indicates the distance W22 from the notch corresponding to the immediately previous frame having an image to be printed to the notch corresponding to this further subsequent frame with respect to a further subsequent frame having an image to be printed. Data F on position may be provided as binary digits indicating these distances or binary digits obtained by converting these distances into numbers of pulses supplied to the pulse motor 20.

Figure 2:
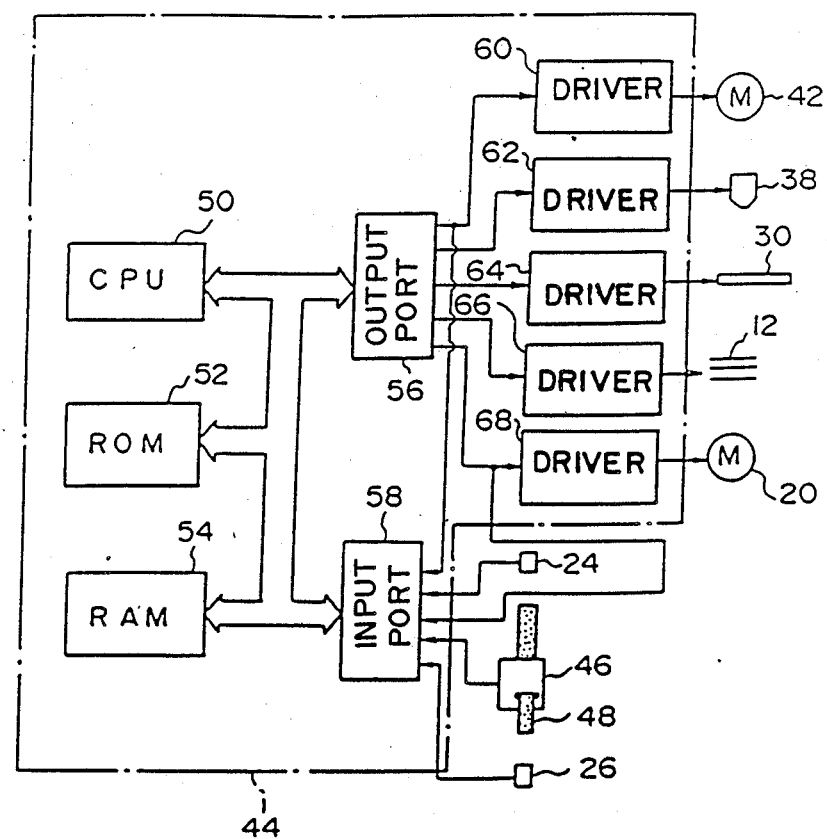
FIG. 2 is a block diagram showing details of a control circuit shown in FIG. 1.

Referring to FIG. 2, the control circuit 44 has a CPU 50, a ROM 52, a RAM 54, an output port 56, an input port 58, and buses connecting these elements including data buses and control buses. The output port 56 is connected, through drivers 60, 62, 64, 66 and 68, to the pulse motor 42, the data printer 38, the black shutter 30, the adjusting filter 12, and the pulse motor 20, respectively. The notch detector 24, the input terminals of the drivers 60 and 68, the reader 46, and the splice detector 26 are connected to the input port 58.

The ROM 52 stores therein a program for the control routines described below. The operation of this embodiment will be described hereunder by giving descriptions concerning the program for the control routines.

Figure 6:
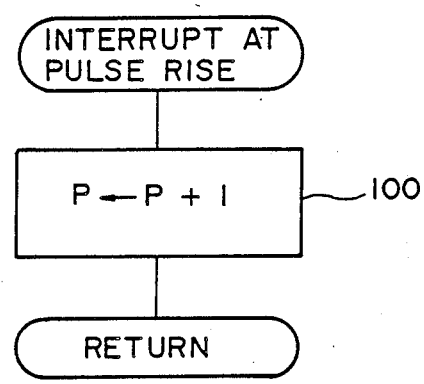
FIG. 6 is a flowchart showing an interrupt routine which is inserted at the rising of a pulse signal for feeding a negative film.

FIG. 6 shows an interrupt routine which is inserted at the rising of a pulse signal supplied to the pulse motor 20 for driving the drive rollers 18 of the film feeder 16. Upon the onset of the pulse signal, the number P of pulses is incremented at Step 100. Thereafter, the program returns to the main routine.

Figure 7:
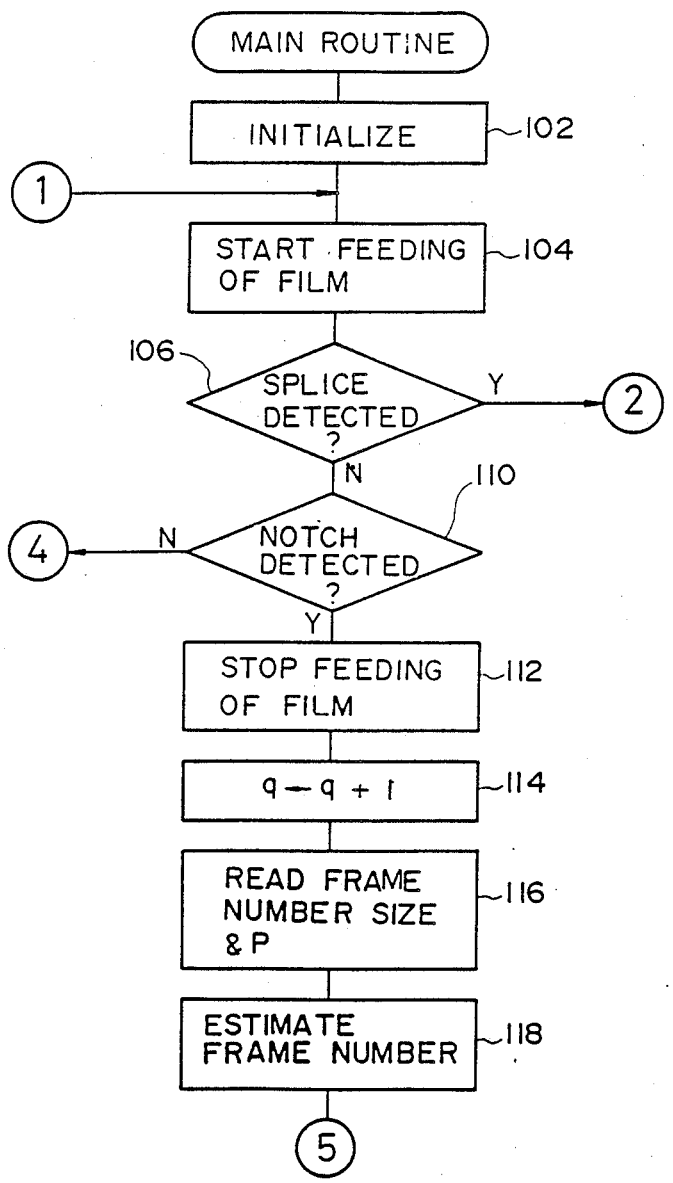
FIGS. 7 (A) to (C) are flowcharts showing the main routine of one embodiment of the present invention.
Figure 7B:
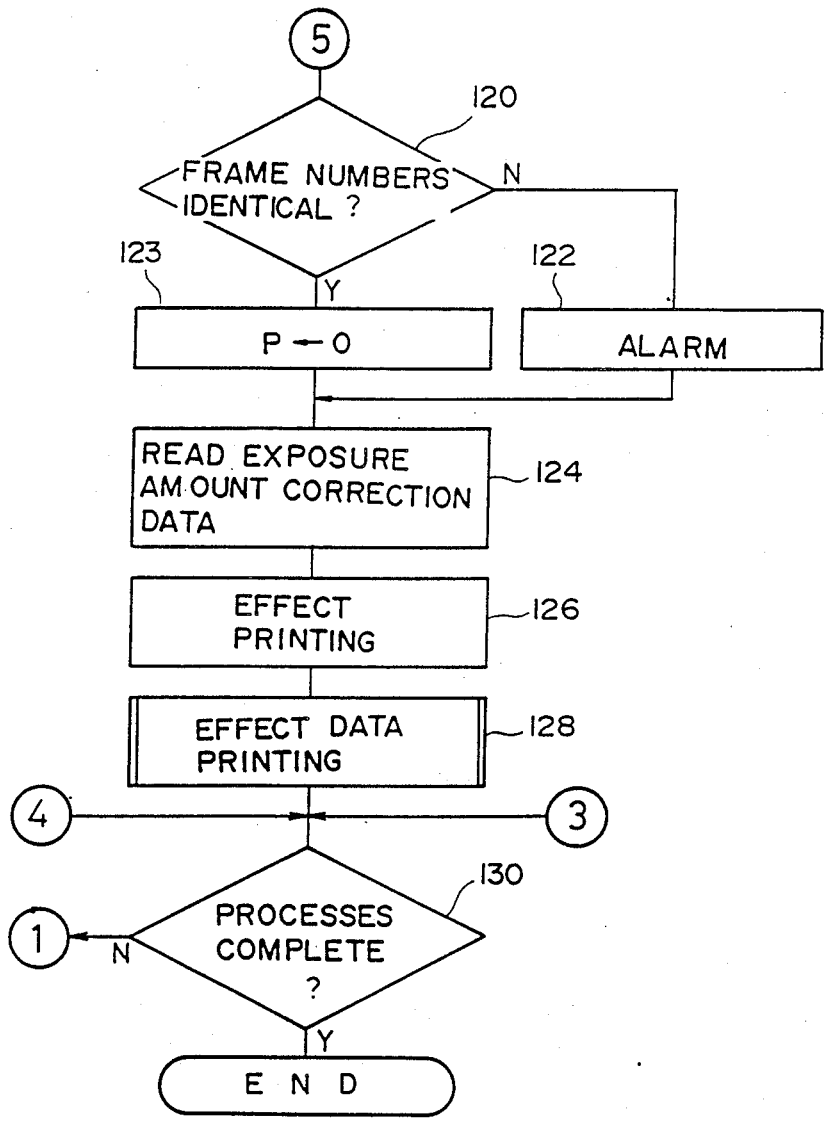
Figure 7C:
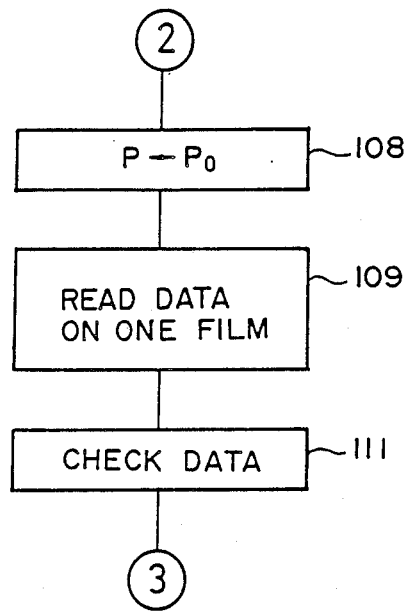

FIGS. 7 (A) to (C) show the main routine of this embodiment. The automatic photograph printer is actuated when the starting switch of the photograph printer is turned on after the printing paper 36 has been set in place, and then the perforated tape 48 and the leading portion connected to the leading negative film have been respectively set in the reader 46 and the film feeder 16. At Step 102, initialization is effected with respect to, for instance, a count value q which indicates the number of notches detected. At the next step 104, a pulse signal is supplied through the driver 68 to the pulse motor 20 to start the rotation of the drive rollers 18, thereby starting the feeding of the negative film 70. At Step 106, it is determined on the basis of a signal output from the splice detector 26 whether a splicing tape piece 72 has been detected. If a splicing tape piece 72 has been detected, the pulse number P is set to its initial value P0 in Step 108. This is followed by the execution of Step 109 where the reader 46 is driven to load data pertinent to one negative film from the perforated tape 48 onto RAM 54. Thereafter, the data is checked at Step 111. This data checking will be described later in detail. The initial value P0 is a pulse number corresponding to the distance between the notch detector 24 and the splice detector 26 (see FIG. 3). In this way, the pulse number P is incremented according to the routine shown in FIG. 6 each time the pulse signal rises, and the pulse number P is then set to the initial value P0 when a splicing tape piece has been detected. Therefore, the pulse number P indicates the number of pulses supplied to the pulse motor 20 from the time of the detection of a splicing tape piece. Because the amount by which the film is fed in response to each pulse is known already, it is possible to detect from the pulse number P the amount by which the film has been fed.

If no splicing tape piece has been detected, Step 110 is executed where it is determined on the basis of a signal output by the notch detector 24 whether a notch has been detected. If a notch 74 has been detected, the feeding of the negative film is stopped, at Step 112. By this action, the image frame corresponding to the detected notch is positioned in the printing position. At the following step 114, the count value q indicating the number of notches detected is incremented. Then, at Step 116, position data F loaded from the perforated tape 48 onto the RAM 54, frame number data D, and data C which indicates the image frame size are read, together with the pulse number P. At step 118, the frame number of the image frame positioned at the printing position is estimated by calculating, from the read pulse number P and the film feeding amount per pulse, the film feeding amount that corresponds to the read pulse number P. That is, for instance, when the film feeding amount is equal to the distance W1 from the splicing tape piece to the notch of the leading frame, the pertinent frame number is estimated to be "1" shown in FIG. 5. With respect to the subsequent image frames, since the negative film is fed by an amount equaling the frame size multiplied by an integer before the film is stopped, the frame number of a subsequent frame with an image to be printed can be estimated by adding 1 to the integral quotient obtained by dividing by the frame size the feeding amount from the leading frame. At the following step 120, it is determined whether the relevant frame number stored in the perforated tape 48 is identical with the frame number thus estimated at Step 118. If these numbers are identical, it is possible to determine that no errors have occurred in the inputting or reading of the data indicating the frame number. Therefore, the program proceeds to 123 where the pulse count value P is set to 0 so as to enable the detection of the feeding amount using, as the reference, the notch that has just been detected. Thereafter, at Step 124, data such as data B, concerning the kind of the negative and exposure amount correction data E are read. Then, at Step 126, a printing process is performed after the exposure amount, which is calculated by the photograph printer, has been corrected on the basis of the exposure amount correction data and taking into consideration the kind of negative. At step 128, while the printing paper which has been subjected to printing at 128 is fed by an amount corresponding to one frame, the data printer 38 is driven, so as to perform a data printing process in which necessary data such as the frame number and the kind of the negative is printed on the reverse surface of the printing paper.

On the other hand, if it is determined, at Step 120, that the frame number stored on the perforated tape 48 and the frame number estimated at Step 118 are not identical, there is a risk that an error might have occurred during the inputting of the frame number or the reading of the data. Therefore, the program proceeds to Step 122 where an alarm or the like is generated, and then goes on to Step 124. Thereafter, the operator stops the automatic photograph printer, confirms the fact that the frame numbers are not identical, and corrects the frame number. At this time, based on the grounds that the estimated frame number is correct, the frame number which is automatically stored in the RAM 54 may be corrected so as to be the same as the estimated frame number. At Step 130, a determination is made as to whether the printing with respect to the entire negative film has been completed. If completion is determined, the routine is terminated.

Data checking at Step 111 will now be described in detail. First, it is determined whether a certain number of items of data corresponding to one negative film has been correctly input and correctly read. For this purpose, data G which are stored on the perforated tape 48 and indicating the number of the frames that are within the one negative film and that have images to be printed, is compared with a count value obtained by counting the items of data of a certain sort which indicates each frame as discriminated from others, for instance, the exposure amount correction data. (Data known as D key data, such as the exposure amount correction data, can be used because it is stored in correspondence with the frames that have images to be printed). By this determination, it is possible to see if a correct number of items of data has been input and read. Further, it is determined whether the read data accords with the codes of data previously registered. By this determination, it is possible to see if there have been any errors in the reading of the data. Still further, since the frame numbers change within one negative film in the direction in which they increase or decrease in the order they have been read or input, the direction in which the read frame numbers change is determined to see if there have been any input errors in the inspection apparatus or any reading errors in the reader. If any abnormality is found after the completion of the above-described checks, an alarm is generated. If necessary, the automatic photograph printer is stopped so that correction can be performed either by the operator or automatically.

Next, a detailed description will be given concerning the data printing process effected at Step 128.

Figure 8:
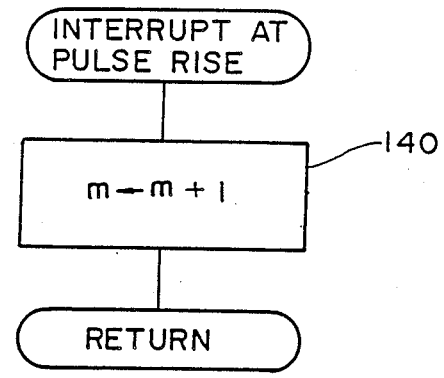
FIG. 8 is a flowchart showing an interrupt routine which is inserted at the rising of a pulse signal for feeding printing paper.

FIG. 8 shows an interrupt routine which is inserted at the onset of a pulse signal for driving the pulse motor 42 connected to the drive rollers 35. Upon the onset of the pulse signal, this interrupt routine is started so that, at Step 140, a count value m indicating the number of pulses is incremented. Thereafter, the program returns to the main routine.

Figure 9A:
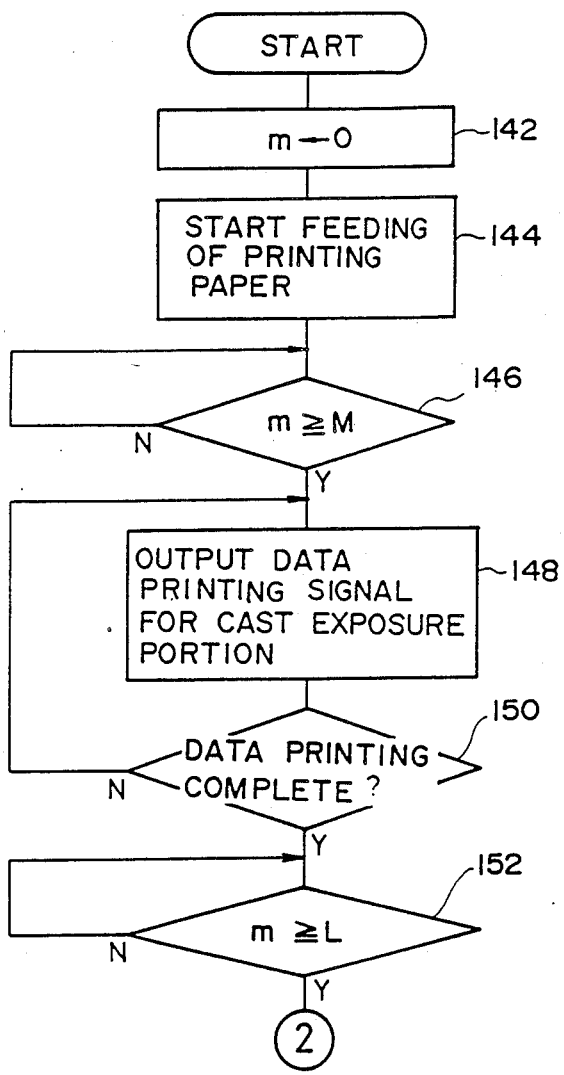
FIGS. 9 (A) and (B) are flowcharts showing details of Step 128 shown in FIGS. 7 (A) to (C)
Figure 9B:
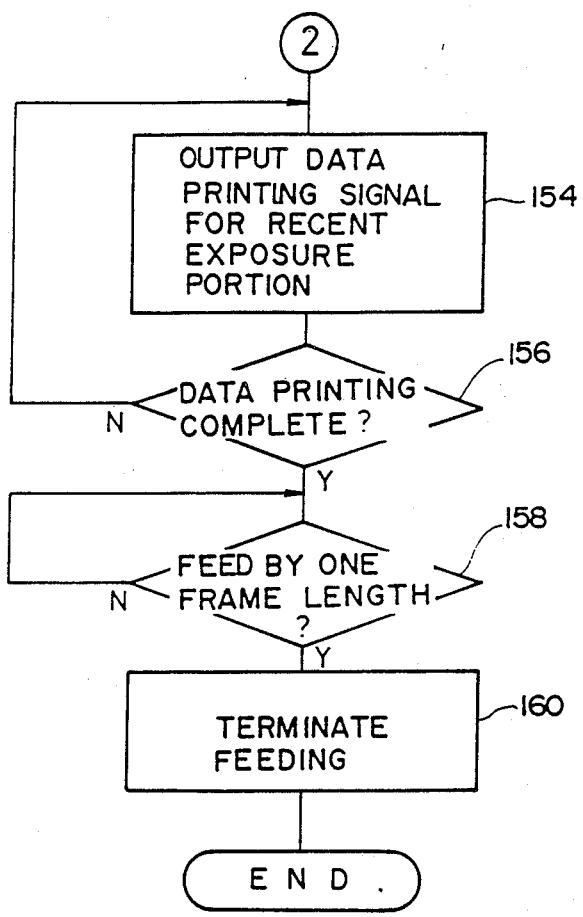

FIGS. 9 (A) and (B) show details of Step 128. The count value m is set to 0 at Step 142, and, thereafter, a pulse signal is supplied to the pulse motor 42 so as to start the feeding of the printing paper 36. At the following step 144, it is determined whether the count value m has become equal to or greater than a predetermined value M. As shown in FIGS. 10 (A) and (B), this predetermined value M is set at a value equal to the number of pulses required to feed the printing paper 36 from the time at which the printing paper feeding has started until a printing paper 36 portion K1 whose exposure to light was completed last time reaches a data printing start position (hereafter the portion K1 will be referred to as the "last exposure portion"). If the count value m is determined to have come above the predetermined value M, at Step 146, it is determined that the printing paper 36 has been fed by an amount required to position the last exposure portion K1 in the position shown in FIG. 10 (B), at which the printing of the latter half of data for the portion K1 is started. At Step 148, a data printing signal is supplied to the data printer 38, and printing is started in order to print the data which has not yet been provided on the portion K1. At the following step 150, it is determined whether the printing with respect to the last exposure portion K1 has been completed, and, if the answer is affirmative, the program proceeds to Step 152. As described above, because data printing is started upon supplying the predetermined pulse number (M) after the supply of the pulse signal to the pulse motor 42 started, it impossible to prevent any printing from being effected during the initial starting period of the pulse motor 42 during which the feeding of the printing paper 36 is unstable. As a result, a gap or blank S where no printing is effected is formed between two groups of printed characters XXX and AAA. The arrangement of printed characters is so determined that such a blank S does not split one unit of data. For instance, if the printed characters XXX denote the frame number while the printed characters AAA denote the exposure amount correction data and the like, they are arranged in such a manner that none of the data such as the frame number is printed as characters skipping over the blank S.

At the following step 152, it is determined whether the count value m has become equal to or greater than a predetermined value L. As shown in FIG. 10 (C), the predetermined value L is set at a value equal to the number of pulses required to feed the printing paper 36 from the time of the start of the feeding of the printing paper 36 until a portion K2 which has recently been exposed (the portion K2 will hereafter be referred to as the "recent exposure portion") reaches a position at which its data printing start portion is immediately below the data printer 38. If the count value m is determined to have come above the predetermined value L, at the step 152, it is determined that the data printing start portion is positioned immediately below the data printer 38, as shown in FIG. 10 (C). Then, Step 154 is executed in which a data printing signal is output to the data printer 38, and the printing of the first half of the data to be provided on the recent exposure portion K2 is started. At the following step 156, it is determined whether this printing of the first half of the data for the recent exposure portion K2 has been completed. If the completion is determined, Step 158 is executed to determine on the basis of the count value m whether the printing paper 36 has been fed by an amount corresponding to one frame. If the printing paper 36 is determined to have been fed by this amount, Step 160 is executed in which the supply of the pulse signal to the pulse motor 42 is stopped whereby the feeding of the printing paper 36 is terminated. Consequently, the printing paper 36 is positioned in the position shown in FIG. 10 (D), and the next exposure is effected with respect to the image of a subsequent frame. Thereafter, the state shown in FIG. 10 (B) is achieved, in which the printing is started so as to print the latter half of data on the exposure portion K2 on which the first-half data (BBB) is already printed.

In the foregoing embodiment, a description is made concerning an example in which, when the printing paper 36 is stopped, the data printer 38 is located at the center of a printing paper 36 portion K1, K2, or the like (i.e., at a position which is one-half of a printing paper portion downstream (in the direction of the feeding of the printing paper 36) from the downstream end of the exposed portion). Alternatively, the data printer 38 may be positioned at this time at a position which is one printing paper portion distant from the downstream end of the exposed portion. In the latter case, since the printing paper 36 is fed in such a manner that the data printer 38 during printing action is not moved across two adjacent printing paper portions, there is no need to give consideration to the arrangement of printed characters, and it suffices if arrangements are made in such a manner as to effect no data printing during the initial starting period of the pulse motor 42.

In the foregoing embodiment, a description is made concerning an example where the position data stored on the paper tape is obtained using the following reference positions: with respect to the leading frame with an image to be printed, the splicing tape piece is used; and with respect to each of the subsequent frames with images to be printed, the notch corresponding to the frame with an image to be printed that is located downstream in the film feeding direction is used. However, if position data is stored with respect to all the frames, there is a risk of the amount of data becoming so great as to make the necessary paper tape lengthy. Therefore, if the distance between two adjacent image frames corresponds to the value of full size or half size (i.e., about 38 mm or about 17 mm), these values may not be input, and the operation may be performed on the assumption that the data is already provided on the reading side.

Further, although paper tape is used as the storage medium in the foregoing embodiment, storage medium of other types, such as a floppy disk, may be alternatively used.

What is claimed is:

1. A photographic printing method including a printing step in which images on frames of an original film are printed onto printing paper, comprising:
   (a) the step of storing data which is necessary to said printing step into a storage medium before said printing step is effected, wherein said data includes frame number data indicating the total number of said frames with said images, and frame data concerned with said frames with said images and stored in correspondence therewith; and
   (b) the step of reading and checking said stored data before printing is effected in said printing step, said checking in said step (b) being effected by comparing said frame number data with a count value obtained by counting the items of said frame data.

2. A photographic printing method according to claim 1, wherein said checking in said step (b) is effected by comparing the read data with data already prepared.

3. A photographic printing method according to claim 1, wherein said data includes a series of frame numbers assigned to said frames with said images in correspondence therewith, said checking in said step (b) being effected by determining whether said series of said frame numbers changes in the increasing direction or in the decreasing direction.

4. A photographic printing method according to claim 1, wherein said step (b) includes a step for informing an abnormality when the abnormality has been found by said checking step.

5. A photographic printing method according to claim 1, wherein said printing step includes a data printing step in which predetermined data among said data is printed on the reverse surface of printing paper on which said images of said frames are printed.

6. A photographic printing method including a printing step in which images on frames of an original film are printed onto printing paper, comprising:
   (a) the step of storing data which is necessary to said printing step into a storage medium before said printing step is effected; and
   (b) the step of reading and checking said stored data before printing is effected in said printing step, wherein said data read in said step (b) includes a series of frame numbers assigned to said frames with said images in correspondence therewith, said printing step including an estimating step in which the frame number assigned to each of said frames with said images is estimated on the basis of the amount by which said original film has been fed and the size of said frames with said images, and including a determining step in which the thus estimated frame number is compared with the read frame number, and it is determined whether said estimated frame number and the read frame number are identical.

7. A photographic printing method according to claim 6, wherein said printing step further includes a step for informing discrepancy when it is determined in said determining step that said compared frame numbers are not identical.

8. A photographic printing method including a printing step in which printing is effected while an elongated original film having a series of frames with images thereon is fed to be subsequently positioned in correspondence with printing paper, comprising:
   (a) a storing step in which data concerned with said series of frames with said images and necessary to said printing step is stored into a storage medium before said printing step, wherein said data includes frame number data indicating the total number of said series of said frames with images, and frame data concerned with said frames with images, said frame data is stored in correspondence with said frames with images; and (b) a checking step in which said stored data is read and checked before printing with respect to the frame leading said series of said frames with said images is started in said printing step, said checking step (b) being effected by comparing said frame number data with a count value obtained by counting the items of said frame data.

9. A photographic printing method according to claim 8, wherein said checking in said step (b) is effected by comparing the read data with data already prepared.

10. A photographic printing method according to claim 8, wherein said data includes frame number data indicating a series of frame numbers assigned to said series of said frames with said images in correspondence therewith, said checking in said step (b) being effected by determining whether said series of said frame numbers changes in the increasing direction or in the decreasing direction in the order in which said series of said frames with said images are arranged.

11. A photographic printing method according to claim 8, wherein said step (b) further includes an informing step in which, when an abnormality has been found by said checking, this abnormality is informed.

12. A photographic printing method according to claim 8, wherein said printing step includes a data printing step in which predetermined data among said data is printed on the reverse surface of printing paper on which said images of said frames are printed.

13. A photographic printing method according to claim 8, wherein said frame data includes exposure correction data used in said printing step to correct the exposure amount in order to obtain an optimal exposure amount, the printing being effected in said printing step using the exposure amount corrected on the basis of the exposure amount correction data.

14. A photographic printing method according to claim 8, wherein said storage medium comprises a tape-shaped member, said storing step being effected by perforating said tape-shaped member.

15. A photographic printing method including a printing step in which printing is effected while an elongated original film having a series of frames with images thereon is fed to be subsequently positioned in correspondence with printing paper, comprising:

(a) a storing step in which data concerned with said series of frames with said images and necessary to said printing step is stored into a storage medium before said printing step; and (b) a checking step in which said stored data is read and checked before printing with respect to the frame leading said series of said frames with said images is started in said printing step, wherein said data read in said step (b) includes frame number data indicating a series of frame numbers assigned to said series of said frames with said images in correspondence therewith, said printing step including an estimating step in which the frame number assigned to each of said frames with said images is estimated on the basis of the amount by which said original film has been fed and the size of said frames with said images, and including a determining step in which the thus estimated frame number is compared with the frame number indicated by said frame number data, and it is determined whether said estimated frame number and the indicated frame number are identical.

16. A photographic printing method according to claim 15, wherein said printing step further includes an informing step in which, when it is determined that said compared frame numbers are not identical, this fact is informed.

* * * * *